Jan. 5, 1960 W. J. CHOYKE 2,920,205
RADIANT ENERGY DETECTOR
Filed Oct. 2, 1957 2 Sheets-Sheet 2

INVENTOR.
WOLFGANG J. CHOYKE
BY
ATTORNEYS

United States Patent Office

2,920,205
Patented Jan. 5, 1960

2,920,205

RADIANT ENERGY DETECTOR

Wolfgang J. Choyke, Wilkinsburg, Pa., assignor, by mesne assignments, to the United States of America as represented by the Secretary of the Air Force Application October 2, 1957, Serial No. 687,838

7 Claims. (Cl. 250—83.3)

This invention relates to photoemission and more particularly to photoemissive radiation detectors.

Increasing the speed of response and the sensitivity of detectors to electromagnetic wave radiation has many desirable uses. For example, it may be used to improve operation of photoelectric tubes. It is particularly valuable in photoimage devices as in television pick-up tubes and in infrared image tubes used in military search devices.

Currently, the most prevalent type of radiation detector used has a time response constant of about $10^{-2}$ seconds. The operation of such detector is based on thermal changes in a photoemissive screen. It is known generally as a phothermionic detector.

Pursuant to the present invention an improved radiant energy detector has been devised capable of extremely high speed of response and a high degree of sensitivity together with other desirable properties and features to be hereinafter disclosed. The speed of response which may be achieved in accordance with the present invention is in the order of $10^{-8}$ seconds. To achieve this fast response rate the present invention utilizes photon energy in a radiant beam such as infrared and ultraviolet light rays as distinguished from the thermal energy in such rays.

Accordingly, a primary object of the present invention is the provision of a detector which has an extremely high speed of response to radiant energy incident thereon.

Another object is the provision of a detector which is sensitive to even very small radiant energy levels.

A further object is the provision of a detector which may be so constructed that it will deliver an electrical output only when two selected, mutually complementing radiation frequencies from two distinct sources, are conjointly applied thereto.

A still further object is the provision of a detector 50 which may be particularly adapted to respond to dual radiation in the infrared and ultraviolet regions, respectively, of the electromagnetic wave spectrum, but only if, and when, such dual radiation is applied from the dual sources in conjoint, mutually complementary fashion.

A still further object is the provision of a detector whose operation is based on light energy measured in photons as distinguished from sensitivity to thermal changes.

And a further object is the provision of a detector which lends itself to semi-transparent construction having a sensitivity to radiation from both front and back sides.

And another object is the provision of a detector which lends itself to close control, which is relatively easy to manufacture, and which lends itself to compact and rugged structural arrangements.

These features, objects and advantages are achieved generally by providing a photosensitive material, with a large energy gap and doped by conventional impurity depositing techniques, an example of which is given in U.S. Patent No. 2,644,852, at col. 3, lines 35–42. Such "doping" serves to provide an impurity band at a desired height above the valence band. The material should be cooled so as to prevent thermal occupation of the impurity band. Subsequently, irradiating this material with radiation having a photon energy just sufficient to excite electrons from the impurity band to the vacuum level will not lead to photoemission but will make the surface sensitive to any additional radiation having sufficient energy to populate the impurity band with electrons from the valence band.

By making the doped-semi-conducting material in the form of a thin coating on a supporting membrane, a photosensitive screen for photoimages is achieved.

By making the membrane transparent to the radiant energy, sensitivity of the screen to radiation from both front and back sides is thereby achieved.

By mounting the screen in a high vacuum container having two distinct windows therein, one to pass radiation from source "A" of an ultra-violet wave length, the other to pass radiation from a separate source "B" of an infra-red wavelength, with both said windows being of filter material for selected radiation wavelengths and providing a cooling arrangement for this structure, sensitivity of the screen to photon energy of the aforesaid selected radiation frequencies as distinguished from thermal energy changes is thereby achieved.

By providing an image reflecting structure at a window, images of a body having a selected wavelength radiation capable of overcoming the small voltage gap may be projected on the screen to form a pattern sensitive to the other selected radiation frequency.

By providing a scanning arrangement of the other radiation frequency on the screen and an electron collector structure at the screen, electrical signals corresponding to the image may be obtained.

By making the screen of a wide band gap material, such as cesium telluride treated as hereinabove indicated, and a supporting membrane of aluminum-oxide sensitivity to the combination of infrared and ultraviolet at both sides of the screen could be achieved.

By making the window for infrared image radiation of barium fluoride, high transparency to the infrared radiation is achieved.

By making the window for the ultraviolet radiation of sapphire high transparency to the ultraviolet radiation is achieved.

These and other features, objects and advantages will become more apparent from the following description taken in connection with the accompanying drawings of an embodiment of the invention and wherein.

Figure 1:
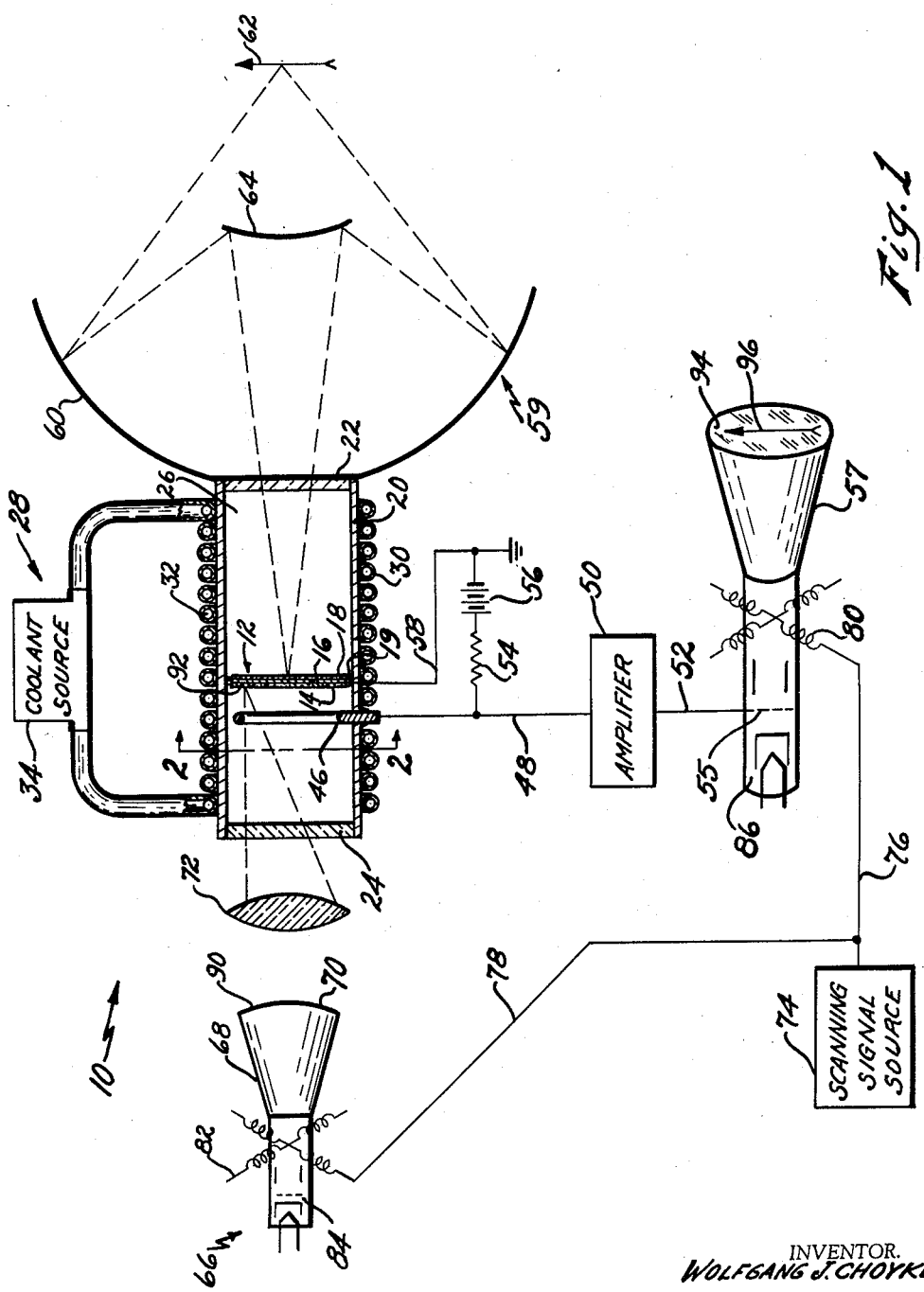
Fig. 1 is a schematic representative of a radiant energy detector made in accordance with the present invention and arranged for reproduction of selected radiant energy images.

Referring to Fig. 1 in more detail, a radiant energy detector made in accordance with the present invention and adapted for operation in an image reproducing device is designated generally by the numeral 10. The detector 10 has a screen 12 which is composed of a photosensitive material layer 14 engaging a layer of conductive material 16 on a support membrane 18. The photosensitive material 14 is composed of a high purity semi-conductor which has been reacted with an or a combination of alkali metals. The particular semi-conductor and alkali metal, or metals, combination used is subject to the requirements of doping which in turn are dependent upon the wavelength of the radiation with which the detector 10 is to operate. For example, if as in the present instance sensitivity to both infrared and ultraviolet radiation is desired, the photosensitive layer 14 may be composed of cesium-telluride suitably doped. While the combination of materials is suitable in the present device, other photosensitive materials such as combinations of elements of group I, V, and VI of the periodic table may also be used depending upon characteristics desired. Any semi-conductor which can be made to have a high quantum yield at the wavelength of the scanning beam, can be treated as hereinabove indicated to give energy level at a desired height above the valence band, and where the energy separation from the impurity states to the vacuum level is larger than that from the bottom of the valence band to the impurity states is suitable for this application. For this purpose the semi-conductor material should preferably be stable, a photoconductor and of a high purity. The semi-conductor alkali metal combination should have the property of absorbing the incident light radiation in relatively few atomic layers. It should, therefore, have neither metallic properties nor properties of colorless salts. The overall work function should not exceed four volts for practical usefulness. Since alkali metals tend to have the lowest work functions, they are found to be most suitable for combining with the semi-conductors. The photosensitive layer 14 is preferably very thin in the order of 1000 angstrom units in thickness.

The thin layer of photosensitive material 14 is in electrical engagement with a thin layer of electrically conductive material such as gold or preferably platinum. The conductive material layer 16 is also very thin, being in the order of 100 angstrom units in thickness.

The supporting membrane 18 is preferably of a material highly transparent to the radiation with which this device is operable. In the present instance an aluminum-oxide membrane 18 is found desirable because of its transparency to infrared radiation which in the present instance is the type of radiation with which the exemplary embodiment is made to operate. The support membrane 18 may also be preferably very thin, in the order of .005 inch in thickness. The membrane 18 is physically attached at its periphery to an electrically conductive ring 19 which is fixed to the walls of a cylindrical housing 20 to provide a suitable strong support structure for the screen 12.

The housing 20 may be of any suitable material, preferably glass and has at one end a light filter window 22 of barium fluoride which is highly transparent to infrared radiation. Other materials for the window 22 may be used depending upon transparency to the radiation wavelength desired. The other end of the housing 20 has light filter window 24, in the present instance of sapphire because of its high degree of transparency to ultraviolet radiation; and while such material may incidentally have the property of passing infrared radiation, as well as ultra-violet radiation, it is the ability to pass ultra-violet rays that dictates its choice for the purposes herein described.

As in the case of the window 22, the window 24 may also be made of other materials depending on the degree of transparency desired for selected radiation wavelengths which, in the case of window 22, is the infrared wavelength range, while in the case of window 24 it is the ultra-violet wavelength range that is to be admitted. Of course, the selected material may also pass other frequencies, but the essential requirement is that window 22 must pass infrared, while window 24 must pass ultra-violet. The windows 22 and 24 are hermetically sealed to the housing cylinder 20 and the inside 26 of the housing 20 is evacuated so as to form a high vacuum envelope for the screen 12.

The temperature of the screen 12 is then lowered by a cooling system 28 comprised of a series of coils 30 wound about the periphery of the housing cylinder 20 and having a hollow interior portion 32 through which may be circulated a cooling agent such as liquid nitrogen from a cooling source 34.

Figure 3:
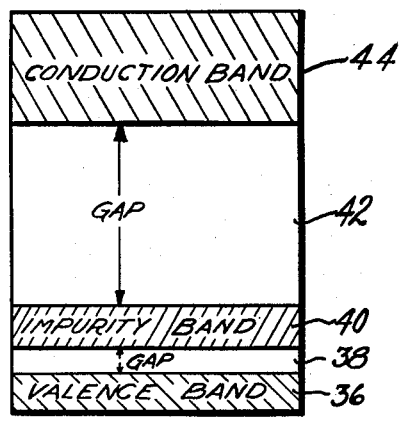
Fig. 3 is a diagrammatic representation in accordance with accepted band theory to more clearly show theoretical operation of the present invention.

The photosensitive material 14 in the screen 12 has conductive properties which may be represented in accordance with the generally accepted band theory by the diagram in Fig. 3. In Fig. 3, the semi-conductor is represented as having a valence band 36 and a small unallowed gap 38, in the order of a few tenths of a volt, which must be overcome for electrons to reach an impurity band 40 introduced by the doping of the primary photosurface material. Above the impurity band is a larger unallowed gap 42, in the order of three to four volts which must be overcome to reach the bottom of the conduction band 44. An additional amount of energy may be required to raise the electrons to the vacuum level and hence out of the surface. Under normal temperature conditions, temperature excitation of the electrons in the material 14 is sufficient to overcome the small unallowed gap 38 so as to keep the impurity band 40 continually supplied with electrons. However, because of the reduction in temperature of the screen 12 to that approaching the temperature of liquid nitrogen in the coil 30, electrons will remain in the valence band 36 and there will be no electrons in the impurity band 40 available for movement to the conduction band 44.

However, while rising temperature is one means for overcoming the small gap 38, light radiation having sufficient photon energy to overcome the small gap 38 may also cause electrons to pass from the valence band 36 to the impurity band 40. In the present instance, cesium telluride as the semi-conductor might be doped such as to have a gap 38 at this low temperature in the order of a few tenths of an electron volt. Infrared radiation incident upon the tellurium mixture 14 releases sufficient photon energy to overcome the gap 38 and to pass electrons from the valence band 36 to the impurity band 40. The doped cesium telluride 14 also has the property wherein the gap 42 between the impurity band 40 and the vacuum level ceiling 43 in the conduction band 44 is of the order of 3.5 ev. An ultraviolet or blue light when incident to this material releases sufficient photon energy to overcome this 3.5 electron volt gap. Thus, if both infrared radiation and ultraviolet radiation are applied simultaneously to the screen material 14, both the small gap 38 and the gap 42 are overcome. Electrons thereby reach the conduction band 44 and thence escape out of the material.

It will be noted that the application of either ultraviolet radiation or infrared radiation alone on the semi-conductor 14 cannot affect the passage of electrons to the conduction band 44. For example, if infrared radiation occurs alone, electrons will thereby pass to the impurity band 40 but will be prevented from reaching the conduction band 44 because of the gap 42. If ultraviolet light is used alone, there are no electrons in the impurity band 40 which can be passed to the conduction band 44 and the electrons remain locked in the valence band 36. This theory of the necessity of concurrent mutually complementary application of two distinct wavelength patterns to detector 10, from opposite directions, as the controlling key to achieve effective operation of the screen material 14 will be further described in its practical application in connection with the image reproducing structure 10 to be hereinafter further described.

Figure 2:
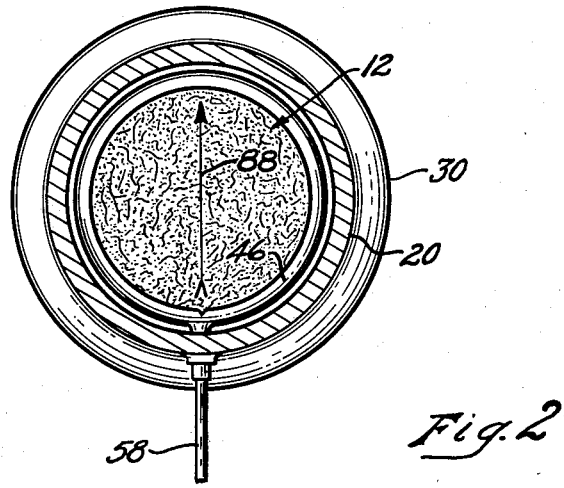
Fig. 2 is a cross section to enlarged scale taken on line 2—2 of Fig. 1 to more clearly show construction.
Figure 4:
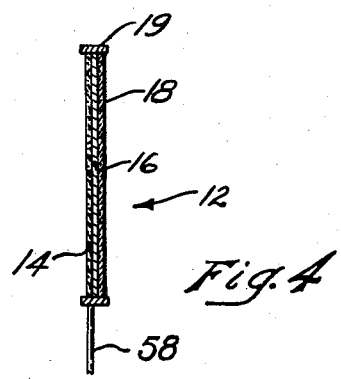
Fig. 4 is a cross sectional showing to enlarged scale of the photosensitive screen of Fig. 1.

In addition to the screen 12 there is also an electron collector or anode 46 in the evacuated chamber 26. The anode 46 may be made of conductive material as copper and may be in the form of a circular ring (Fig. 2) in spaced relation to the screen 12. The anode 46 is connected through electric conduction line 48, to an amplifier 50 which in turn is connected through an electric line 52 to a control grid 55 of a suitable cathode ray tube 57. The anode 46 is also connected through the electric power line 48, and a resistor 54 to the positive terminal of a direct current power source as a battery 56, the negative terminal of which is connected through an electric power line 58 to the platinum layer 16 of the screen 12. The line 58 is also connected to ground.

At the barium fluoride window 22 there may also be placed a suitable lens system or reflector arrangement 59 such as the large reflector 60 for picking up radiation from a body 62 and projecting it to another reverse reflector 64 arranged to effect a reproduction of the image 62 on to the screen 12. Since the filter 22 is highly transparent to infra-red radiation, and since the radiation from source 62 is predominantly of the chosen infra-red wavelength, the said infrared radiation from the body 62 will reach the screen 12. This infrared radiation on the screen material 14 will overcome the gap 38 (Fig. 3) to produce electrons in the impurity band 40 having a pattern identical to that of the radiating body 62.

At the end of the housing 20 containing the screen 24, there is placed a scanning mechanism 66. The scanning mechanism 66 includes a suitable cathode ray tube 68 having a fluorescent screen 70. Between the fluorescent screen 70 and the photosensitive screen 12 is interposed a suitable lens system 72 such that any spot of light occurring on the fluorescent screen 70 will be projected by the lens system 72 in a similarly related position on the photosensitive screen 12. Since the filter 24 is highly transparent to ultra-violet radiation, and since the radiation from source 66 is predominantly of the chosen ultra-violet wavelength, the said ultraviolet radiation passing through the lens 72 will be permitted to reach the photosensitive screen 12. A scanning signal source 74 is connected through suitable couplings represented by lines 76 and 78 to deflection coils or deflection plates 80 and 82 respectively, in the cathode ray tubes 57 and 68, respectively. The scanning signal source 74 may be of conventional design as customarily used with cathode ray tubes as 57 and 68. The cathode ray tube 68 also has an electron gun 84 of conventional design hooked to a voltage power source (not shown) in conventional manner. Similarly, the cathode ray tube 57 has an electron gun 86, which, except for the control grid 54 is connected to a voltage power source (not shown) in conventional manner. The electrical connections and voltage power source are not shown here because they are of conventional nature and may be such as found in the publication Cathode Ray Tube Displays by Soller, Star and Valley, published by McGraw-Hill Book Company, 1948.

In the operation of the present detector 10 for reproducing images, infrared radiation from a selected body 62 is projected by means of the reflector system 59 through the infrared filter 22 to the screen 12. This image of infrared radiation on the screen 12, which is at a low temperature because of the cooling system 28, causes electrons to pass from the valence band 36 (Fig. 3) to the impurity band 40 on those portions of the screen 12 where the infrared rays occur. Thus such electrons will exist on the screen 12 in the nature of an image 88 (Fig. 2) similar to the image 62. Because of the scanning signal source 74 and the electron gun 84, a small spot of light 90 rapidly moving across the fluorescent screen 70 of the cathode ray tube 68 will be projected by the lens system 72 onto the photosensitive screen 12 as a moving spot of light 92 following the exact pattern of the light spot 90 on the fluorescent screen 70. The comparable spot of light 92 on the screen 12 will be composed of the ultra-violet radiation from source 66, which ultra-violet radiation readily passes through the filter 24. The ultraviolet spot of light 92 in passing across the screen 12 will have no effect upon the electrical conductivity of the screen 12 unless and until it reaches a position occupied by a portion of the infrared image 88. In such instance the combination of infrared radiation and the ultraviolet spot 92 will cause an instantaneous flow of electrons from the impurity band 40 to the conduction band 44 and thence to leave the surface 14. The electron collector electrode or anode 46 which is maintained at a substantial positive potential (in the order of 400 volts) with respect to the screen 12, will attract such electrons leaving the surface 14. The electrons passing from the image 88 on the screen 12 to the anode 46, will pass through the line 48 and the resistor 54 to cause a change in potential in the line 48 which is suitably amplified by the amplifier 50 and fed to the control grid 55 of the cathode ray tube 57. This amplified signal will cause an increase in the electron flow from the electron gun 86 to a fluorescent screen 94 in the cathode ray tube 57. Such increased flow of electrons each time the spot 92 passes the infrared image 88 thereby effects a reproduction 96 of the image 88 on the fluorescent screen 94 because of the identical nature of scanning by the deflection coils 80 and 82.

Not only is the image 96 the same in shape as the original image 62 but also the brightness or intensity of the image 96 will vary as a function of the intensity of the infrared radiation from the image 62. Thereby faithful reproduction both in appearance and shading of the original image may be obtained with the radiation detector 10.

This invention is not limited to the specific materials and structural arrangements shown as equivalents will suggest themselves to those skilled in the art.

What is claimed is:

1. In a radiation detector of the type requiring photon energy of at least two different wavelengths of radiation for electron emission in the detector, the combination of a cathode assembly having gap-separated valence, impurity, and conduction bands effective to deliver an electron output only when said two different wavelengths of radiation reach said cathode assembly simultaneously, thereby causing both separating gaps of said cathode assembly to be concurrently spanned, thus sending an electron output to said conduction band, electron collector means in spaced relation to said conduction band for attracting electrons from said conduction band, and means for cooling the cathode assembly to a temperature below that at which emission occurs from photon excitation by either of said wavelengths of radiation separately.

2. A combination as in claim 1 wherein the semi-conductor is cesium telluride in combination with a doping impurity and the two types of radiation are infrared and ultraviolet.

3. In a radiation detector of the type having electron flow from a valence, impurity, and conduction band energy levels separated by a pair of gaps both of which may be overcome only by the concurrent application of photon energy from two radiation sources operating at preselected wavelengths of widely divergent but complementary magnitudes, the combination of a cathode comprised of a high purity semi-conductor and an impurity having said energy level band characteristics, electron collector means in spaced relation to the cathode for attracting electrons from the cathode, and means for cooling the cathode to a temperature confining the electrons to the valence band energy level.

4. In combination, a screen comprising a thin supporting layer, a coating on said layer, said coating comprised of a photoelectric material having a valence band, impurity band and a conduction band for electrons and a first and second gaps therebetween, means for retaining electrons in the valence band, and means for supplying photon energy to said coating for overcoming said gaps.

5. In combination, a screen comprising a thin supporting layer transparent to radiation of a selected frequency, a coating on said layer, said coating comprised of a photoelectric material having a valence band, impurity band and a conduction band for electrons and a first and second gaps therebetween, means for illuminating said coating from the side of said layer with said selected frequency radiation for overcoming said first gap, and means for illuminating said coating from the side opposite said layer with radiation of a frequency for overcoming said second gap.

6. In combination, a vacuum tight envelope, a screen comprising a thin supporting layer in said envelope, a coating on said layer, said coating comprised of a photoelectric material having a valence band, impurity band and a conduction band for electron flow and a first and second gaps therebetween, means for cooling said material for confining electrons in the valence band, means for focusing on said material an image of wavelength radiation overcoming said first gap, means for scanning said screen coating with a wavelength radiation overcoming said second gap, and means coupled to said material for indicating the electron flow.

7. In combination, a vacuum tight envelope, a screen comprising a thin supporting layer in the envelope transparent to a selected frequency radiation, a coating on one side of the layer, the coating comprised of a photoelectric material having a valence band, impurity band and a conduction band for electron flow and a first and second gaps therebetween, an electron collection electrode adjacent the screen coating in the envelope, cooling means about the envelope, the envelope including a pair of hermetically sealed window filters straddling said screen, the filter on the support layer side of the screen being transparent to radiation of said selected frequency for overcoming the first gap, and the other filter being transparent to radiation of a frequency for overcoming said second gap.

References Cited in the file of this patent
UNITED STATES PATENTS

| | | |
|---|---|---|
| 2,227,030 | Schlesinger | Dec. 31, 1940 |
| 2,248,985 | Gray | July 15, 1941 |
| 2,522,153 | Andrews | Sept. 12, 1950 |
| 2,541,374 | Morton | Feb. 13, 1951 |
| 2,644,852 | Dunlap | July 7, 1953 |
| 2,671,154 | Burstein | Mar. 2, 1954 |